United States Patent
Yun et al.

(10) Patent No.: US 9,284,906 B2
(45) Date of Patent: Mar. 15, 2016

(54) COMBUSTION PHASING CONTROL METHODOLOGY IN HCCI COMBUSTION

(75) Inventors: Hanho Yun, Oakland Township, MI (US); Nicole Wermuth, Garching Bei München (DE); Paul M. Najt, Bloomfield Hills, MI (US); Jun-Mo Kang, Ann Arbor, MI (US); Chen-Fang Chang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1229 days.

(21) Appl. No.: 13/155,434

(22) Filed: Jun. 8, 2011

(65) Prior Publication Data

US 2012/0316757 A1  Dec. 13, 2012

(51) Int. Cl.
| | |
|---|---|
| *F02D 28/00* | (2006.01) |
| *F02D 41/30* | (2006.01) |
| *F02D 41/40* | (2006.01) |
| *F02P 5/15* | (2006.01) |
| *F02D 13/02* | (2006.01) |
| *F02D 35/02* | (2006.01) |
| *F02D 41/00* | (2006.01) |

(52) U.S. Cl.
CPC ........ *F02D 41/3035* (2013.01); *F02D 13/0207* (2013.01); *F02D 35/028* (2013.01); *F02D 41/401* (2013.01); *F02P 5/1502* (2013.01); *F02D 41/3041* (2013.01); *F02D 2041/001* (2013.01); *Y02T 10/128* (2013.01); *Y02T 10/18* (2013.01); *Y02T 10/44* (2013.01); *Y02T 10/46* (2013.01)

(58) Field of Classification Search
CPC ....... Y02T 10/46; Y02T 10/128; F02D 37/02; F02D 41/3029; F02D 41/3035; F02D 41/3041; F02D 35/028; F02P 5/1502; F02P 5/1514
USPC ................. 123/295, 406.23, 406.24, 406.26, 123/406.41, 406.45, 406.47, 434–436, 676, 123/704; 701/102–105, 109, 110; 73/35.03, 73/35.06, 35.07, 35.12, 114.16

See application file for complete search history.

(56) References Cited

U.S. PATENT DOCUMENTS

| | | | | | |
|---|---|---|---|---|---|
| 4,478,185 | A | * | 10/1984 | Obayashi et al. | 123/406.23 |
| 4,976,241 | A | * | 12/1990 | Ishida et al. | 123/406.37 |
| 5,103,789 | A | * | 4/1992 | Hartman et al. | 123/435 |
| 5,113,828 | A | * | 5/1992 | Remboski et al. | 123/406.28 |
| 5,460,031 | A | * | 10/1995 | Fujishita et al. | 73/35.03 |
| 5,577,476 | A | * | 11/1996 | Iyoda | 123/406.33 |
| 5,642,705 | A | * | 7/1997 | Morikawa | F02B 17/005 |
| | | | | | 123/300 |
| 5,682,856 | A | * | 11/1997 | Tomisawa et al. | 123/406.22 |
| 5,738,074 | A | * | 4/1998 | Nakamura et al. | 123/305 |

(Continued)

FOREIGN PATENT DOCUMENTS

| | | | | | |
|---|---|---|---|---|---|
| EP | 1744037 | A1 * | 1/2007 | | F02D 35/00 |
| JP | 03011159 | A * | 1/1991 | | F02P 5/15 |

(Continued)

*Primary Examiner* — Mahmoud Gimie
*Assistant Examiner* — John Zaleskas

(57) ABSTRACT

Controlling combustion in a spark-ignition direction-injection internal combustion engine includes providing an initial injected fuel mass timing and an initial spark ignition timing. A combustion phasing error is monitored and compared with each of the initial injected fuel mass timing and the initial spark ignition timing. An adjusted injected fuel mass timing and an adjusted desired spark ignition timing is determined based on the comparing for maintaining a desired combustion phasing.

12 Claims, 4 Drawing Sheets

(56) References Cited

U.S. PATENT DOCUMENTS

| | | | |
|---|---|---|---|
| 5,778,857 A * | 7/1998 | Nakamura et al. | 123/406.37 |
| 5,797,367 A * | 8/1998 | Iida et al. | 123/295 |
| 6,024,069 A * | 2/2000 | Yoshino | 123/295 |
| 6,283,096 B1 * | 9/2001 | Kimura | 123/501 |
| 6,397,817 B1 | 6/2002 | Yoshida | |
| 6,647,949 B2 * | 11/2003 | Hosokawa et al. | 123/295 |
| 7,246,599 B2 * | 7/2007 | Sauler et al. | 123/406.23 |
| 7,246,600 B2 * | 7/2007 | Nakashima et al. | 123/435 |
| 7,293,555 B2 * | 11/2007 | Kato | F02D 41/182 123/321 |
| 2001/0006054 A1 * | 7/2001 | Yoshizawa et al. | 123/295 |
| 2004/0084025 A1 * | 5/2004 | Zhu et al. | 123/435 |
| 2005/0005908 A1 * | 1/2005 | Tanei et al. | 123/406.33 |
| 2005/0039721 A1 * | 2/2005 | Truscott et al. | 123/406.22 |
| 2006/0016425 A1 * | 1/2006 | Kono et al. | 123/305 |
| 2006/0169243 A1 * | 8/2006 | Neunteufl et al. | 123/295 |
| 2006/0196467 A1 * | 9/2006 | Kang et al. | 123/305 |
| 2006/0196468 A1 * | 9/2006 | Chang et al. | 123/305 |
| 2007/0000475 A1 * | 1/2007 | Asano | 123/305 |
| 2007/0113821 A1 * | 5/2007 | Kang et al. | 123/299 |
| 2007/0119417 A1 * | 5/2007 | Eng et al. | 123/305 |
| 2007/0250256 A1 * | 10/2007 | Kang et al. | 701/115 |
| 2008/0264382 A1 * | 10/2008 | Kang | 123/435 |
| 2009/0007888 A1 * | 1/2009 | Sarlashkar et al. | 123/478 |
| 2009/0020102 A1 * | 1/2009 | Fattic | 123/472 |
| 2009/0266335 A1 * | 10/2009 | Kawamura et al. | 123/406.19 |
| 2009/0312931 A1 * | 12/2009 | Wang et al. | 701/102 |
| 2009/0312932 A1 * | 12/2009 | Wang et al. | 701/102 |
| 2010/0116249 A1 * | 5/2010 | Guerrassi et al. | 123/435 |
| 2010/0222985 A1 * | 9/2010 | Yun et al. | 701/103 |
| 2010/0242902 A1 * | 9/2010 | Kang et al. | 123/305 |

FOREIGN PATENT DOCUMENTS

| | | | |
|---|---|---|---|
| JP | 11037026 A | * | 2/1999 |
| JP | 2000154772 A | * | 6/2000 |

* cited by examiner

COMBUSTION PHASING CONTROL METHODOLOGY IN HCCI COMBUSTION

TECHNICAL FIELD

This disclosure relates to operation and control of homogeneous-charge compression-ignition (HCCI) engines.

BACKGROUND

The statements in this section merely provide background information related to the present disclosure. Accordingly, such statements are not intended to constitute an admission of prior art.

Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One of these is known in the art as the homogeneous charge compression ignition (HCCI). HCCI combustion includes a distributed, flameless, auto-ignition combustion process that is controlled by oxidation chemistry, rather than by fluid mechanics. In a typical engine operating in HCCI combustion mode, the cylinder charge is nearly homogeneous in composition temperature at intake valve closing time. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low nitrous oxides (NOx) emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy. The HCCI engine can also operate at stoichiometry with substantial amounts of exhaust gas recirculation (EGR).

There is no direct control of start of combustion for an engine operating in the auto-ignition mode, as the chemical kinetics of the cylinder charge determine the start and course of the combustion. Chemical kinetics are sensitive to temperature and, as such, the controlled auto-ignition combustion process is sensitive to temperature. One variable affecting the combustion initiation and progress is the effective temperature of the cylinder structure, i.e., temperature of cylinder walls, head, valve, and piston crown. Additionally, spark-assisted ignition is known to facilitate combustion in certain operating ranges.

Operation within an HCCI mode at higher loads can be problematic, as energy present within the combustion chamber increases with increasing load. This increasing energy, exhibited for example by higher temperatures within the air fuel charge being combusted, increases likelihood of the air fuel charge combusting before the intended combustion point, resulting in an undesirable pressure wave or ringing from the combustion chamber.

SUMMARY

Controlling combustion in a spark-ignition direction-injection internal combustion engine includes providing an initial injected fuel mass timing and an initial spark ignition timing. A combustion phasing error is monitored and compared with each of the initial injected fuel mass timing and the initial spark ignition timing. An adjusted injected fuel mass timing and an adjusted desired spark ignition timing is determined based on the comparing for maintaining a desired combustion phasing.

BRIEF DESCRIPTION OF THE DRAWINGS

One or more embodiments will now be described, by way of example, with reference to the accompanying drawings, in which.

DETAILED DESCRIPTION

Figure 1:
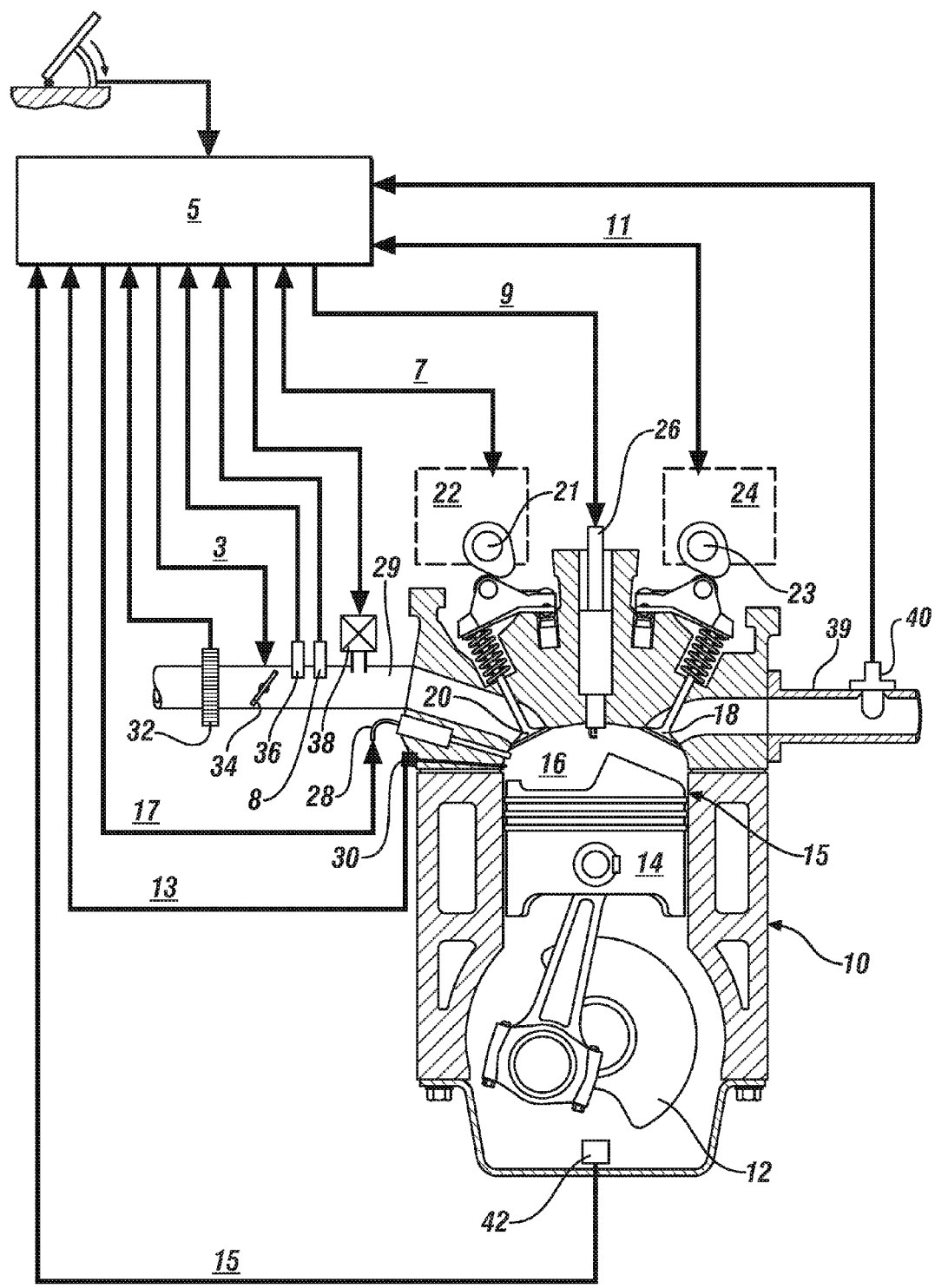
FIG. 1 is a schematic drawing of an exemplary engine system in accordance with the present disclosure.

Referring now to the drawings, wherein the depictions are for the purpose of illustrating certain exemplary embodiments only and not for the purpose of limiting the same, FIG. 1 schematically shows an exemplary internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode and a homogeneous spark-ignition (SI) combustion mode. The engine 10 is selectively operative at a stoichiometric air/fuel ratio and at an air/fuel ratio that is primarily lean of stoichiometry. It is appreciated that the concepts in the disclosure can be applied to other internal combustion engine systems and combustion cycles.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an external exhaust gas recirculation (EGR) valve 38. The control module 5 is operative to control mass flow of exhaust gas to the intake manifold 29 by controlling opening of the EGR valve 38. Hence, an intake oxygen ($O_2$) concentration entering the engine can be controlled by controlling the opening of the EGR valve 38. In an exemplary embodiment, the intake $O_2$ concentration in the intake manifold 29 when the EGR valve is closed 38 is substantially 21%. The intake $O_2$ concentration can be monitored by an oxygen sensor 8.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) 7 from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal (EXHAUST) 11 from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18, respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal 17 from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) 9 from the control module 5.

The engine 10 is equipped with various sensing devices for monitoring engine operation, including a crank sensor 42 having output RPM and operative to monitor crankshaft rotational position, i.e., crank angle and speed, a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine an indicated mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal) to determine a torque request (To_req). It will be appreciated that the torque request can be in response to an operator input (e.g., via the accelerator pedal and the brake pedal) or the torque request can be in response to an auto start condition monitored by the control module 5. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position opening to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean or stoichiometric air/fuel ratio. Substantially wide-open throttle can include operating fully unthrottled, or slightly throttled to create a vacuum in the intake manifold 29 to affect EGR flow. In one embodiment, in-cylinder EGR mass is controlled to a high dilution rate. The intake and exhaust valves 20 and 18 are in the low-lift valve position and the intake and exhaust lift timing operate with NVO. One or more fuel injection events can be executed during an engine cycle including at least one fuel injection event during a compression phase.

During engine operation in the homogeneous spark-ignition (SI) combustion mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when air charge within the cylinder is substantially homogeneous.

Combustion phasing in each cylinder depends upon the thermal environment within each cylinder when the engine is operating in the controlled auto-ignition (HCCI) mode including spark-assisted ignition during high-load operation. Combustion phasing describes the progression of combustion in a cycle as measured by the crank angle of the cycle. One convenient metric to judge combustion phasing is CA50 or the crank angle at which 50% of the air fuel charge is combusted. One will appreciate that properties of a combustion cycle, such as efficiency, combustion noise and combustion stability, are affected by CA50 of the cycle. Thus, maintaining an optimal/desired combustion phasing is important during high load HCCI operation. During a specified injection timing, spark timing and valve timings for a cylinder event, an un-balanced combustion phasing can result in each cylinder due to non-uniform in-cylinder conditions including non-uniform distribution of the external EGR percentage, non-uniform in-cylinder thermal conditions and/or variations from injector-to-injector in each cylinder. Therefore, a fixed calibration of the injection timing and spark timing is not desirable due to the non-uniform in-cylinder conditions.

As will become apparent, maintaining a desired combustion phasing can be achieved by adjusting injected fuel mass timing and adjusting spark ignition timing based on comparing a combustion phasing error with each of an initial injected fuel mass timing and an initial spark ignition timing. Maintaining a desired combustion phasing for a given engine speed and desired injected fuel mass can maintain acceptable combustion properties. The combustion properties include combustion noise, combustion efficiency and combustion stability.

Embodiments discussed herein utilize a control strategy (i.e., a combustion phasing controller) for adjusting combustion initiation timings (i.e., adjusted injected fuel mass timing and adjusted spark ignition timing) to control a monitored combustion phasing to converge toward a desired combustion phasing while operating the engine over an entire operating range when the injected fuel mass is delivered in a single injection. Hence, the controls strategy includes controlled auto-ignition (HCCI) mode including spark-assisted ignition during high-load operation, low- and medium-load auto-ignition (HCCI) operation and stoichiometric operation. Adjustments to injected fuel mass timing are more dominant in controlling combustion phasing in controlled auto-ignition (HCCI) mode. Adjustments to initial spark ignition timing are more dominant in controlling combustion phasing in stoichiometric operation.

Figure 2:
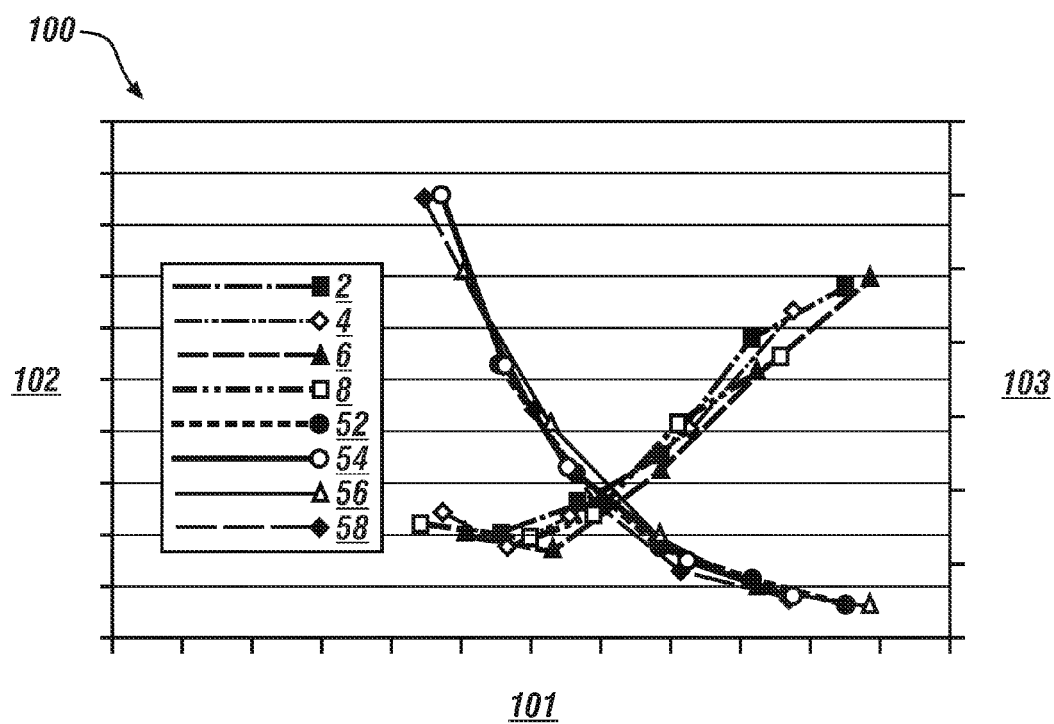
FIG. 2 is a graph depicting the effect of combustion phasing (CA50 in degrees after top dead center) 101 on ringing index 103 and coefficient of variation (COV) of indicated mean effective pressure (IMEP) 102 during high load homogeneous-charge compression-ignition (HCCI) operation in accordance with the present disclosure.

FIG. 2 illustrates a graph 100 depicting the effect of combustion phasing (CA50 in degrees after top dead center) on ringing index and coefficient of variation (COV) of indicated mean effective pressure (IMEP) during high load HCCI operation in accordance with the present disclosure. The horizontal axis 101 represents combustion phasing (i.e., CA50) in degrees after top dead center. The vertical axes 102, 103 represent the COV of IMEP and the ringing index, respectively. Profile lines 52, 54, 56 and 58 depict the ringing index of first, second, third and fourth cylinders, respectively, according to the combustion phasing 101 in degrees after top dead center. Profile lines 2, 4, 6 and 8 depict the COV of IMEP of the first, second, third and fourth cylinders, respectively, according to the combustion phasing 101 in degrees after top dead center. This disclosure is not limited to an engine utilizing four cylinders and can utilize any number of cylinders.

Figure 3:
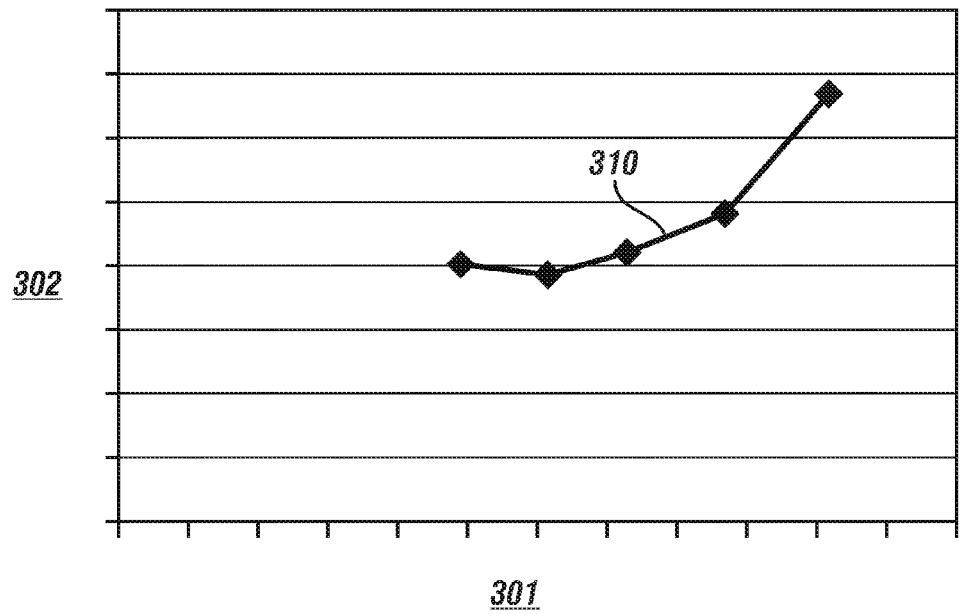
FIG. 3 illustrates a graph depicting the effect of combustion phasing (CA50 in degrees after top dead center) 301 on net specific fuel consumption (NSFC) 302 during high load HCCI operation in accordance with the present disclosure.

FIG. 3 illustrates a graph 300 depicting the effect of combustion phasing (CA50 in degrees after top dead center) on net specific fuel consumption (NSFC) 302 during high load HCCI operation in accordance with the present disclosure. The horizontal axis 301 represents the combustion phasing (CA50) in degrees after top dead center. The vertical axis 302 represents the NSFC. Profile line 310 denotes the NSFC according to the combustion phasing (i.e., CA50) in degrees after top dead center. The desired combustion phasing, for example, can be determined by considering the ring index, emissions index, COV of IMEP, and NSFC as shown in FIGS. 2 and 3.

Figure 4:
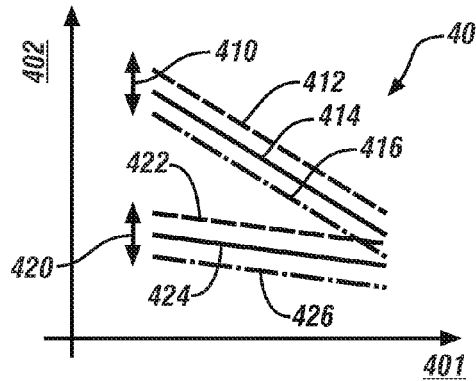
FIG. 4 graphically depicts the range of adjustable fuel injection timing 402 as a function of engine load 401 and intake oxygen concentration 410 and 420 in accordance with the present disclosure.

FIG. 4 illustrates a range of adjustable fuel injection timings in accordance with an exemplary embodiment of the present disclosure. Graph 400 depicts upper and lower bounds 410, 420, respectively, for an initial injected fuel mass timing. The horizontal axis 401 denotes engine load. The vertical axis 402 denotes injected fuel mass timing at an end of injection (EOI) before top-dead center (bTDC). The injected fuel mass can be delivered in a single injection. The upper bound or limit 410 of initial fuel injection timing includes solid profile line 414 denoting the upper bound 410 initial fuel injection timing when a monitored intake $O_2$ concentration achieves a desired intake $O_2$ concentration respective of the upper bound. The desired intake $O_2$ concentration is determined to meet a desired in-cylinder charge composition for maintaining a desired combustion phasing. Dashed profile line 412 denotes the upper bound of initial fuel injection timing when the monitored intake O2 concentration is less than the desired intake $O_2$ concentration. Dotted profile line 416 denotes the upper bound of initial fuel injection timing when the monitored intake $O_2$ concentration is greater than, or exceeds, the desired intake $O_2$ concentration. Likewise, the monitored intake $O_2$ concentration during the lower bound or limit 420 initial fuel injection timing includes solid profile line 424 denoting the lower bound 420 initial fuel injection timing when the monitored intake O2 concentration achieves a desired intake $O_2$ concentration respective of the lower bound. Dashed profile line 422 denotes when the monitored intake O2 concentration is less than the desired intake $O_2$ concentration. Dotted profile line 426 denotes when the monitored intake $O_2$ concentration that is greater than, or exceeds, the desired intake $O_2$ concentration.

Discussed in greater detail below with reference to FIG. 6, at least one of upper and lower bounds or limits of the initial injected fuel mass timing can be adjusted based on an intake $O_2$ concentration error, the intake $O_2$ concentration error based on deviations between a monitored respective $O_2$ concentration from a previous combustion cycle and a respective desired intake $O_2$ concentration. For instance, at least one of the upper and lower bounds or limits of the initial injected fuel mass timing can be retarded when the monitored intake $O_2$ concentration of the previous combustion cycle is greater than, or exceeds, the desired intake $O_2$ concentration. Similarly, at least one of the upper and lower bounds or limits of the initial injected fuel mass timing can be advanced when the monitored intake $O_2$ concentration of the previous combustion cycle is less than the desired intake $O_2$ concentration.

The upper bound or limit for the initial injected fuel mass timing corresponds to a respective crank angle location (e.g., bTDC) having a most advanced timing acceptable for avoiding excessive combustion noise. Advanced timing refers to timing occurring earlier in the combustion cycle. The lower bound or limit for the initial injected fuel mass timing corresponds to a crank angle location (e.g., bTDC) having a most retarded timing acceptable for avoiding combustion stability deterioration. Retarded timing refers to timing occurring later in the combustion cycle. Analysis of the graph 400 reveals that the upper and lower bounds (i.e., most advanced and most retarded timing limits) 410, 420, respectively, of the initial injected fuel mass become increasingly retarded in response to increases in load transients (e.g., injected fuel mass transients). The upper and lower bounds of the initial injected fuel mass timing define a range avoiding excessive combustion noise and combustion stability deterioration, respectively.

Figure 5:
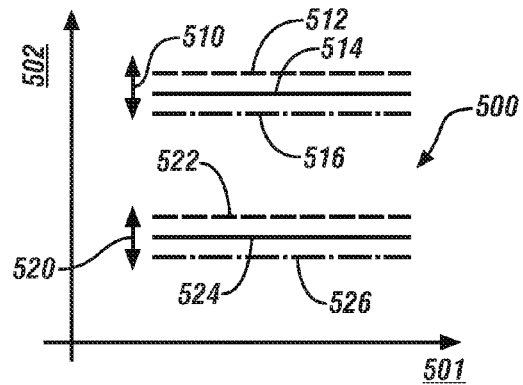
FIG. 5 graphically depicts the range of adjustable spark timing 502 as a function of engine load 501 and intake oxygen concentration 510 and 520 in accordance with the present disclosure.

FIG. 5 illustrates a graph 500 upper and lower bounds 510, 520, respectively, for an initial spark ignition timing. The horizontal axis 501 denotes engine load. The vertical axis 502 denotes spark ignition timing (bTDC). The upper bound or limit 510 of initial spark ignition timing includes solid profile line 514 denoting the upper bound 510 initial spark ignition timing when a monitored intake $O_2$ concentration achieves a desired intake $O_2$ concentration respective of the upper bound. The desired intake $O_2$ concentration is determined to meet a desired in-cylinder charge composition for maintaining a desired combustion phasing. Dashed profile line 512 denotes the upper bound of initial spark timing when the monitored intake $O_2$ concentration is less than the desired intake O2 concentration. Dotted profile line 516 denotes the upper bound of initial spark timing when the monitored intake $O_2$ concentration is greater than, or exceeds, the desired intake $O_2$ concentration. Likewise, the monitored intake $O_2$ concentration during the lower bound or limit 520 initial spark ignition timing includes solid profile line 524 denoting the lower bound 520 initial spark ignition timing when the monitored intake O2 concentration achieves a desired intake O2 concentration respective of the lower bound. Dashed profile line 522 denotes when the monitored intake $O_2$ concentration is less than the desired intake $O_2$ concentration 524. Dotted profile line 526 denotes when the monitored intake O2 concentration that is greater than, or exceeds, the desired intake $O_2$ concentration 524.

Discussed in greater detail below with reference to FIG. 6, at least one of upper and lower bounds or limits of the initial spark ignition timing can be adjusted based on an intake $O_2$ concentration error, the intake $O_2$ concentration error based on deviations between a monitored respective $O_2$ concentration from a previous combustion cycle and a respective desired intake $O_2$ concentration. For instance, at least one of the upper and lower bounds or lmits of the initial spark ignition timing can be retarded when the monitored intake $O_2$ concentration of the previous combustion cycle is greater than, or exceeds, the desired intake $O_2$ concentration. Similarly, at least one of the upper and lower bounds or limits of the initial spark ignition timing can be advanced when the monitored intake $O_2$ concentration of the previous combustion cycle is less than the desired intake $O_2$ concentration.

The upper bound or limit for the initial spark ignition timing corresponds to a respective crank angle location (e.g., bTDC) having a most advanced timing acceptable for avoiding excessive combustion noise. Advanced timing refers to timing occurring earlier in the combustion cycle. The lower bound or limit for the initial injected fuel mass timing corresponds to a crank angle location (e.g., bTDC) having a most retarded timing acceptable for avoiding combustion stability deterioration. Retarded timing refers to mining occurring later in the combustion cycle. Analysis of the graph 500 reveals that the upper and lower bounds (i.e., most advanced and most retarded timing limits) 510, 520, respectively, of the initial spark ignition timing are independent of engine load transients. The upper and lower bounds or limits of the injected fuel mass timing can be pre-calibrated, where the upper and lower bounds of the initial spark ignition timing define a range avoiding excessive combustion noise and combustion stability deterioration, respectively.

Intake $O_2$ concentration is controlled by the EGR valve 38. Therefore, the intake $O_2$ concentration is inversely related to an external EGR percentage or concentration. As aforementioned, when the EGR valve 38 is closed, the intake $O_2$ concentration in the intake manifold 29 is at or around 21%. For instance, when a monitored intake O2 concentration is less than a desired intake $O_2$ concentration, a monitored external EGR percentage is greater than a desired external EGR percentage for maintaining a desired combustion phasing. Hence, when the desired intake $O_2$ concentration is less than the desired intake $O_2$ concentration, the external EGR percentage is too high and a combustion phasing that is too retarded from a desired combustion phasing results. A retarded combustion phasing refers to a combustion phasing occurring later in the combustion cycle. Likewise, when the monitored intake $O_2$ concentration is greater than, or exceeds, the desired intake $O_2$ concentration, the monitored external EGR percentage is less than the desired external EGR percentage for maintaining the desired combustion phasing. Hence, when the desired intake $O_2$ concentration is greater than the desired intake $O_2$ concentration, the external EGR percentage is too low and a combustion phasing that is too advanced from a desired combustion phasing results. An advanced combustion phasing refers to a combustion phasing occurring earlier in the combustion cycle.

Figure 6:
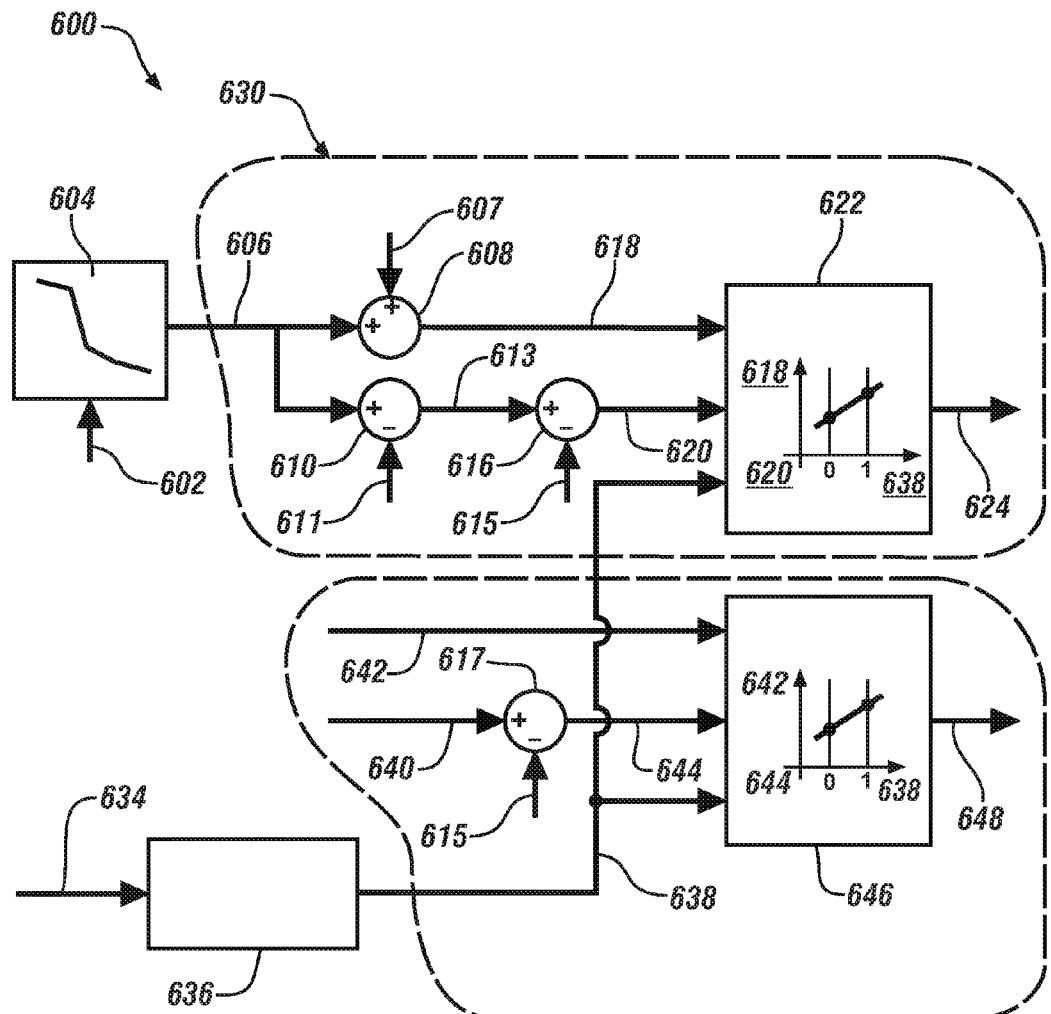
FIG. 6 schematically illustrates a combustion phasing controller 600 for maintaining a desired combustion phasing in each cylinder of a multi-cylinder engine based on adjustments to the injection timing and the spark timing.

FIG. 6 schematically illustrates a combustion phasing controller 600 for maintaining a desired combustion phasing in each cylinder of a multi-cylinder engine based on adjusting combustion initiation parameters. The desired combustion phasing is determined for maintaining acceptable combustion properties including combustion noise, combustion efficiency and combustion stability. Combustion initiation parameters can include injected fuel mass timing (i.e., injection timing) and spark ignition timing (i.e., spark timing). The combustion phasing controller 600 is associated with the control module 5 and includes an injected fuel mass timing controller 630 and a spark ignition timing controller 632. The injected fuel mass timing controller 630 determines an adjusted injected fuel mass timing (i.e., adjusted injection timing) 624 for maintaining a desired combustion phasing (i.e., CA50). The spark timing controller 632 determines an adjusted spark ignition timing (i.e., adjusted spark timing) 648 for maintaining the desired combustion phasing. It will be appreciated that the adjusted injection and spark timings 624, 648, respectively, can be utilized in association with one another to control monitored combustion phasing to converge toward the desired combustion phasing. The adjusted injection timing 624 can be dominantly utilized to control the monitored combustion phasing to converge toward the desired combustion phasing when the engine is operating in the controlled auto-ignition mode. The adjusted spark timing 648 can be dominantly utilized to control the monitored combustion phasing to converge toward the desired combustion phasing when the engine is operating with a stoichiometric air-fuel ratio including spark-assisted ignition. The injected fuel mass under all operating conditions can be delivered to each cylinder in a single injection. It will be appreciated that combustion phasing can be indicated by CA50, corresponding to the crank angle location aTDC at which 50% of the air fuel charge is combusted. CA50 for each cylinder can be monitored during each engine cycle. The external EGR valve 38 is adjusted to control the intake $O_2$ concentration into the engine.

The injected fuel mass timing controller 630 includes upper and lower limit timing units 608, 610, respectively, a correction unit 616 and an injection interpolation module (IIM) 622. Engine operating parameters 602 are input to an injection timing module (ITM) 604 and an initial injected fuel mass timing 606 is determined and monitored by the injected fuel mass timing controller 630. The engine operating parameters 602 can include desired engine speed, desired injected fuel mass and/or desired engine load in response to a torque request. As aforementioned, the torque request can be in response to an operator input (e.g., via the accelerator pedal and the brake pedal), or the torque request can be in response to an auto start condition monitored by the control module 5. The initial injected fuel mass timing 606 is input to each of the upper and lower limit timing units 608, 610, respectively. Based on an upper correction 607 and the initial injected fuel mass timing 606, the upper limit timing unit 608 outputs an upper bound limit 618 for the initial injected fuel mass timing 606. Likewise, based on a lower correction 611 and the initial injected fuel mass timing 606, the lower limit timing unit 610 outputs a lower bound limit 613 for the initial injected fuel mass timing 606. The upper and lower corrections 607, 611, respectively, can be based on the engine operating parameters 602. The upper bound limit 618 corresponds to a crank angle location having a most advanced timing acceptable for avoiding excessive combustion noise. The upper bound limit 618 can be referred to as a most advanced timing limit. The lower bound limit 613 corresponds to a crank angle location having a most retarded timing acceptable for avoiding combustion stability deterioration. The lower bound or limit 613 can be referred to as a most retarded timing limit. The lower bound limit 613 is input to the correction unit 616. Utilizing a signal 615 based on an intake $O_2$ concentration error, the correction unit 616 can adjust the lower bound limit 613 to output an adjusted lower bound limit 620 of the initial injected fuel mass 606. The intake $O_2$ concentration error is based on deviations between a monitored intake $O_2$ concentration from a previous combustion cycle and a desired intake $O_2$ concentration. The desired intake $O_2$ concentration is determined to meet a desired in-cylinder charge composition for maintaining a desired combustion phasing. Therefore, the adjusted lower bound limit 620 assists in rapidly achieving the desired combustion phasing by compensating for intake $O_2$ concentration errors. The injected fuel mass timing controller 630 is not limited to adjusting the lower bound limit 613 and can include a similar correction unit for adjusting the upper bound limit 618 based on the intake $O_2$ concentration error. Adjusting at least one of respective upper and lower bounds or limits 618, 613, respectively, based on the intake O2 concentration error is discussed above with reference to FIG. 4 and will not be discussed further herein. The upper bound limit 618 and the adjusted lower bound limit 620 are input to the IIM 622 to be compared and interpolated with a bounded control signal 638 corresponding to a combustion phasing error 634, to thereby determine the adjusted injected fuel mass timing 624 utilized to control combustion phasing to converge toward the desired combustion phasing.

The spark ignition timing controller 632 includes a correction unit 617 and a spark interpolation module (SIM) 646. Initial upper and lower bound or limit spark ignition timings 642, 640, respectively, are input to—and monitored by—the spark ignition timing controller 632. The initial upper and lower bound or limit spark ignition timings 642, 640, respectively, can be either dependent upon- or pre-calibrated independent of—engine operating parameters including desired engine speed, desired injected fuel mass and/or desired engine load. The initial upper and lower bound limit spark ignition timings 642, 640, respectively, can define a range avoiding excessive combustion noise and combustion stability deterioration, respectively. The initial upper bound or limit 642 corresponds to a crank angle location having a most advanced timing acceptable for avoiding excessive combustion noise. The initial upper bound or limit 642 can be referred to as a most advanced timing limit. The initial lower bound limit 640 corresponds to a crank angle location having a most retarded timing acceptable for avoiding combustion stability deterioration. The initial lower bound or limit 640 can be referred to as a most retarded timing limit. In an alternative embodiment, the initial upper and lower bound limits 642, 640, respectively, can be based upon engine operating parameters in a similar manner as the fuel injection timing controller 630. The initial lower bound limit 640 is input to the correction unit 617. Utilizing the signal 615 which based on the intake O2 concentration error, the correction unit 617 can adjust the initial lower bound limit 640 to output an adjusted lower bound limit 644. The spark ignition timing controller 632 is not limited to adjusting the initial lower bound or limit 640 and can include a similar correction unit for adjusting the initial upper bound or limit 642 based on the intake $O_2$ concentration error. Adjusting at least one of the respective initial upper and lower bound limits 640, 642, respectively, based on an intake $O_2$ concentration error is discussed above with reference to FIG. 5 and will not be discussed further herein. The initial upper bound or limit 642 and the adjusted lower bound limit 644 are input to the SIM 646 to be compared and interpolated with the bounded control signal 638 corresponding to the combustion phasing error 634, to thereby determine the adjusted spark ignition timing 648 utilized to control combustion phasing to converge toward a desired combustion phasing.

Embodiments envisioned include comparing the combustion phasing error 634 with each of the initial injected fuel mass timing (i.e., upper bound or limit 618 and adjusted lower bound or limit 620) and the initial spark timing (e.g., upper bound or limit 642 and adjusted lower bound or limit 644) and determining adjusted injected fuel mass and spark ignition timings 624, 648, respectively, based on the comparing for maintaining the desired combustion phasing. Specifically, the initial combustion initiation timings having most advanced and most retarded timing limits are interpolated with the bounded control signal 638 to determine adjusted combustion initiation timings (i.e., adjusted injected fuel mass and adjusted spark ignition timings 624, 648, respectively) and utilizing the adjusted combustion initiation timings to control the monitored combustion phasing to converge toward the desired combustion phasing, the desired combustion phasing determined for maintaining acceptable combustion properties including combustion noise, combustion efficiency and combustion stability.

The combustion phasing error 634 is based on deviations between a monitored combustion phasing from a previous combustion cycle and the desired combustion phasing. The combustion phasing error 634 is input to—and monitored by—a control signal module 636, to generate the bounded control signal. The bounded control signal 638 is bounded within a range including an upper bound limit corresponding to a monitored combustion phasing from a previous combustion cycle occurring earlier than the desired combustion phasing and a lower bound limit corresponding to the monitored combustion phasing from the previous combustion cycle occurring later than the desired combustion phasing. In other words, the bounded control signal 638 is defined by upper and lower bounds, wherein the lower bound corresponds to the monitored combustion phasing at a most retarded crank angle location from the desired combustion phasing and the upper bound corresponding to the monitored combustion phasing at a most advanced crank angle location from the desired combustion phasing. In a non-limiting example, the upper and lower bounds are "1" and "0", respectively. Within the IIM 622 and SIM 646, respective upper and lower bounds for each of the initial injected fuel mass timing and the initial spark ignition timing are interpolated based on the bounded control signal 638 associated with the combustion phasing error 634. For instance, the adjusted combustion initiation timings 624 and 648 are retarded toward respective most retarded timing limits in accordance with the combustion phasing error (i.e., bounded control signal) corresponding to an amount the monitored combustion phasing from the previous combustion cycle is advanced from the desired combustion phasing. Hence, the monitored combustion phasing is retarded to converge toward the desired combustion phasing based on the retarding the combustion initiation timings toward respective most retarded timing limits in accordance with the combustion phasing error (e.g., bounded control signal). Likewise, the adjusted combustion initiation timings 624 and 648 are advanced toward respective most advanced timing limits in accordance with the combustion phasing error (i.e., bounded control signal) corresponding to an amount the monitored combustion phasing from the previous combustion cycle is retarded from the desired combustion phasing. Hence, the monitored combustion phasing is advanced to converge toward the desired combustion phasing based on the advancing the combustion initiation timings toward respective most advanced timing limits in accordance with the combustion phasing error (e.g., bounded control signal).

Figure 7:
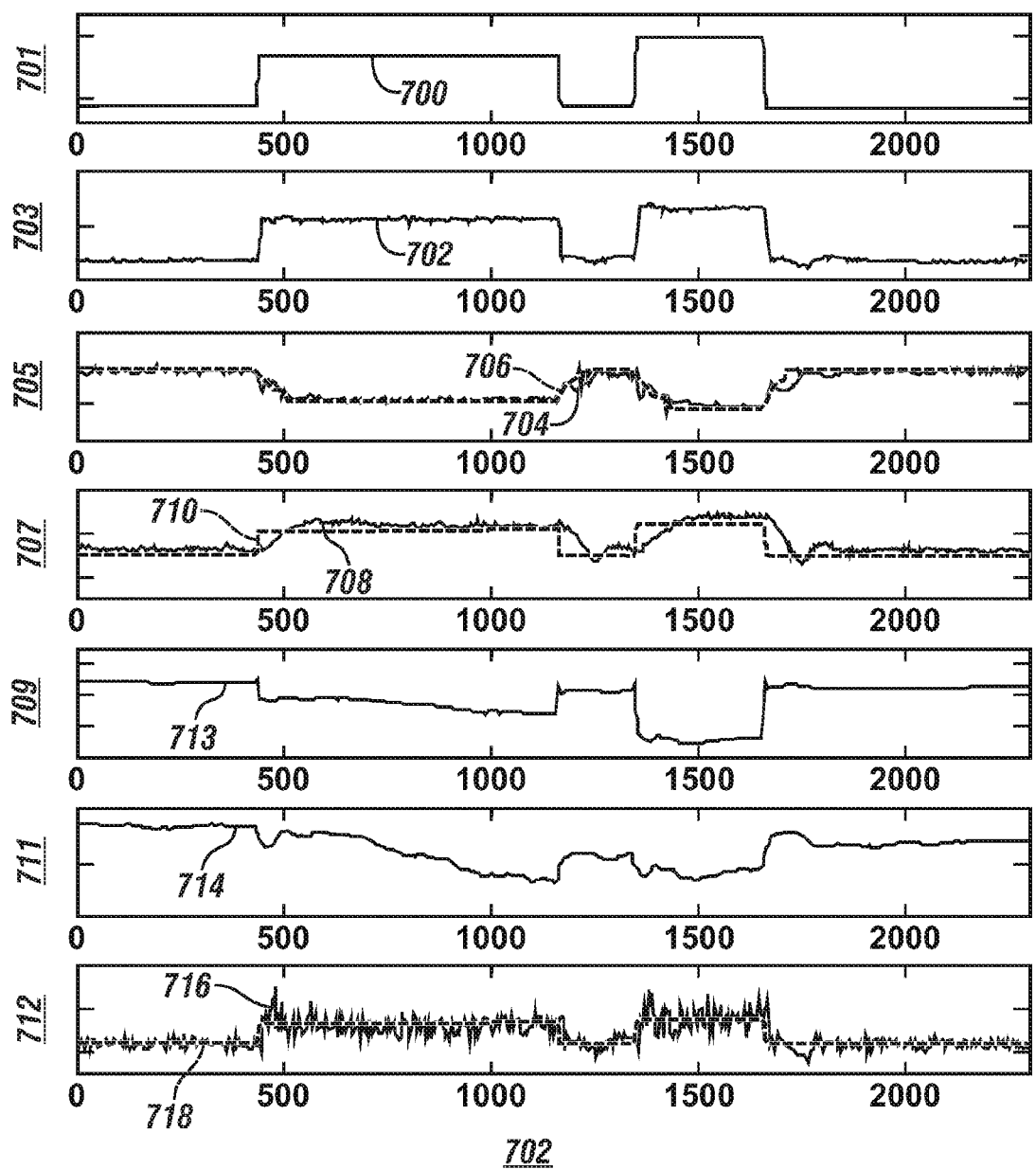
FIG. 7 graphically depicts experimental and derived data from an exemplary engine, depicting a number of engine events 702 versus injected fuel mass 701, power (i.e., IMEP (bar)) 703, air-fuel ratio 705, intake burn gas fraction 707, fuel injection timing 709, spark ignition timing 711 and CA50 (i.e., crank angle location of 50% fuel mass burn) 712 in accordance with the present disclosure.

FIG. 7 graphically depicts experimental and derived data from an exemplary engine, depicting plots for injected fuel mass 701, IMEP 703, air-fuel ratio 705, intake burn gas fraction 707, fuel injection timing (end of injection (EOI) crank angle location in degrees before top-dead-center) 709, spark ignition timing (crank angle location in degrees before top-dead-center) 711 and CA50 (i.e., crank angle location in degrees of 50% fuel mass burn after top-dead-center) 712 in accordance with the present disclosure. The horizontal axis denotes a number of engine events for plots 701, 703, 705, 707, 709, 711 and 712. The injected fuel mass 701 plot includes a profile line 700 indicating the monitored injected fuel mass during the engine events. The IMEP 703 plot includes a profile line 702 indicating the monitored IMEP during the engine events. The air-fuel ratio 705 plot includes a profile line 704 indicating the monitored air-fuel ratio and a dashed line 706 indicating a desired air-fuel ratio. The intake burn gas fraction 707 includes a profile line 708 indicating the monitored intake burn gas fraction and a dashed line 710 indicating a desired intake gas burn fraction. The fuel injection timing 709 plot includes a profile line 713 indicating the adjustments to the fuel injection timing in accordance with utilizing the combustion phasing controller 600 of FIG. 6. The spark ignition timing 711 plot includes a profile line 714 indicating the adjustments to the spark ignition timing in accordance with utilizing the combustion phasing controller 600 of FIG. 6. The CA50 plot 712 includes a profile line 716 indicating the monitored CA50 during the engine events and a dashed line 718 indicating the desired CA50 during the engine events. t is appreciated that profile lines 704, 708 and 716 demonstrate minimal deviation or error from respective dashed lines 706, 710 and 718

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling combustion in a spark-ignition direct-injection internal combustion engine, including an engine controller, a spark-ignition system and a fuel injector, comprising:
    providing an initial injected fuel mass timing;
    providing a respective upper bound for each of the initial injected fuel mass timing and an initial spark ignition timing corresponding to respective crank angle locations having most advanced timings acceptable for avoiding excessive combustion noise at a desired engine load;
    providing a respective lower bound for each of the initial injected fuel mass timing and the initial spark ignition timing corresponding to respective crank angle locations having most retarded timings acceptable for avoiding combustion stability deterioration at the desired engine load;
    adjusting the lower bounds for the initial injected fuel mass timing and the initial spark ignition timing based on an intake $O_2$ concentration error, the intake $O_2$ concentration error based on a deviation between a monitored $O_2$ concentration from a previous combustion cycle and a desired intake $O_2$ concentration;
    monitoring a combustion phasing error based on deviations between a monitored combustion phasing from a previous cycle and a desired combustion phasing;
    generating a bounded control signal associated with the monitored combustion phasing error and defined by an upper bound and a lower bound;
    determining an adjusted fuel mass timing comprising interpolating between the upper and lower bounds for the initial injected fuel mass timing based on the upper and lower bounds of the generated bounded control signal associated with the monitored combustion phasing error;
    determining an adjusted spark ignition timing comprising interpolating between the upper and lower bounds for the initial spark ignition timing based on the upper and lower bounds of the generated bounded control signal associated with the monitored combustion phasing error; and
    controlling the spark-ignition system and the fuel injector with the determined adjusted fuel mass timing and the determined adjusted spark ignition timing.

2. The method of claim 1 wherein the initial injected fuel mass timing comprises a crank angle location at an end of injection, the initial injected fuel mass delivered in a single injection.

3. The method of claim 1 wherein adjusting the lower bounds for the initial injected fuel mass timing and the initial spark ignition timing based on the intake $O_2$ concentration error comprises:
    retarding lower bounds for the initial injected fuel mass timing and the initial spark ignition timing when the monitored intake $O_2$ concentration of the previous combustion cycle exceeds the desired intake $O_2$ concentration.

4. The method of claim 1 wherein adjusting the lower bounds for the initial injected fuel mass timing and the initial spark ignition timing based on the intake $O_2$ concentration error comprises:
    advancing lower bounds for the initial injected fuel mass timing and the initial spark ignition timing when the monitored intake $O_2$ concentration of the previous combustion cycle is less than the desired intake $O_2$ concentration.

5. The method of claim 1 wherein generating the bounded control signal associated with the monitored combustion phasing error comprises:
    the bounded control signal within a range including an upper bound limit corresponding to a monitored combustion phasing from the previous combustion cycle occurring earlier than the desired combustion phasing and a lower bound limit corresponding to the monitored combustion phasing from the previous combustion cycle occurring later than the desired combustion phasing.

6. The method of claim 1 wherein providing an initial injected fuel mass timing comprises providing upper and lower bounds of the initial injected fuel mass timing based on engine speed and desired injected fuel mass, wherein the upper and lower bounds of the initial injected fuel mass timing define a range avoiding excessive combustion noise and combustion stability deterioration.

7. A method for controlling combustion in a spark-ignition direct-injection internal combustion engine, including an engine controller, a spark-ignition system and a fuel injector, comprising:
    providing initial combustion initiation timings having respective most advanced and most retarded timing limits comprising:
        providing an initial injected fuel mass timing having most advanced and most retarded timing limits at a desired engine load, and
        providing most advanced and most retarded initial spark ignition timing limits at the desired engine load;
    adjusting the most retarded timing limits for the initial injected fuel mass timing and the initial spark ignition timing based on an intake $O_2$ concentration error, the intake $O_2$ concentration error based on a deviation between a monitored $O_2$ concentration from a previous combustion cycle and a desired intake $O_2$ concentration;
    monitoring combustion phasing from the previous combustion cycle and a desired combustion phasing to determine a combustion phasing error;
    generating a bounded control signal associated with the determined combustion phasing error and defined by an upper bound and a lower bound;
    interpolating between the respective most advanced and most retarded timing limits based on the upper and lower bounds of the generated bounded control signal associated with the determined combustion phasing error to determine adjusted combustion initiation timings comprising an adjusted injected fuel mass timing and an adjusted spark ignition timing;
    utilizing the adjusted combustion initiation timings to control the monitored combustion phasing to converge toward the desired combustion phasing, comprising controlling the spark-ignition system and the fuel injector with the adjusted combustion initiation timings.

8. The method of claim 7 wherein said most advanced and most retarded timing limits are increasingly retarded with increases in engine load.

9. The method of claim 7 wherein generating a bounded control signal associated with the determined combustion phasing error and defined by an upper bound and a lower bound comprises generating a bounded control signal defined by a lower bound corresponding to combustion phasing at a most retarded crank angle location from the desired combustion phasing and an upper bound corresponding to combustion phasing at a most advanced crank angle location.

10. The method of claim 7 wherein interpolating between the respective most advanced and most retarded timing limits based on the upper and lower bounds of the generated bounded control signal associated with the determined combustion phasing error to determine adjusted combustion initiation timings comprising an adjusted injected fuel mass timing and an adjusted spark ignition timing comprises:
   retarding the combustion initiation timings toward respective most retarded timing limits in accordance with the generated bounded control signal corresponding to an amount the monitored combustion phasing from the previous combustion cycle is advanced from the desired combustion phasing; and
   advancing the combustion initiation timings toward respective most advanced timing limits in accordance with the generated bounded control signal corresponding to an amount the monitored combustion phasing from the previous combustion cycle is retarded from the desired combustion phasing.

11. The method of claim 7 wherein utilizing the adjusted combustion initiation timings to control the monitored combustion phasing to converge toward the desired combustion phasing comprises:
   dominantly utilizing the adjusted injected fuel mass timing to control the monitored combustion phasing to converge toward the desired combustion phasing when the spark-ignition direct-injection internal combustion engine is operating in a controlled auto-ignition mode.

12. The method of claim 7 wherein utilizing the adjusted combustion initiation timings to control the monitored combustion phasing to converge toward the desired combustion phasing comprises:
   dominantly utilizing the adjusted spark ignition timing to control the monitored combustion phasing to converge toward the desired combustion phasing when the spark-ignition direct-injection internal combustion engine is operating with a stoichiometric air-fuel ratio including spark-assisted ignition.

* * * * *